(12) United States Patent
Perkins et al.

(10) Patent No.: US 10,134,491 B2
(45) Date of Patent: Nov. 20, 2018

(54) APPLICATION OF COMPRESSED MAGNETIC FIELDS TO THE IGNITION AND THERMONUCLEAR BURN OF INERTIAL CONFINEMENT FUSION TARGETS

(71) Applicant: Lawrence Livermore National Security, LLC, Livewrmore, CA (US)

(72) Inventors: Lindsay John Perkins, Pleasanton, CA (US); Jim H. Hammer, Livermore, CA (US); John D. Moody, Livermore, CA (US); Max Tabak, Livermore, CA (US); George Beedon Zimmerman, Lafayette, CA (US); Burl Grant Logan, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1075 days.

(21) Appl. No.: 14/278,611

(22) Filed: May 15, 2014

(65) Prior Publication Data

US 2014/0348283 A1 Nov. 27, 2014

Related U.S. Application Data

(60) Provisional application No. 61/826,598, filed on May 23, 2013.

(51) Int. Cl.
  *H05H 1/22* (2006.01)
  *G21B 1/19* (2006.01)
  (Continued)

(52) U.S. Cl.
  CPC ............... *G21B 1/19* (2013.01); *G21B 1/03* (2013.01); *G21B 1/05* (2013.01); *Y02E 30/14* (2013.01); *Y02E 30/16* (2013.01)

(58) Field of Classification Search
  CPC .. H05H 1/00; H05H 1/02; H05H 1/03; H05H 1/04; H05H 1/06; H05H 1/08; G21B 1/00;
  (Continued)

(56) References Cited

U.S. PATENT DOCUMENTS

| 4,277,305 | A | * | 7/1981 | Bohachevsky | .......... | G21B 1/00 376/103 |
| 8,837,661 | B2 | * | 9/2014 | Wessel | ..................... | G21B 1/03 376/158 |
| 2006/0126771 | A1 | * | 6/2006 | Da Conceicao | .......... | F03H 1/00 376/100 |

OTHER PUBLICATIONS

Friedman, et al., "Toward a physics design for NDCX-II, and ion accelerator for warm dense matter and HIF target physics studies", Nucl. Instr. And Mthods in Phys. Res. A 606(200), 6-10.*

(Continued)

*Primary Examiner* — Marshall P O'Connor
(74) *Attorney, Agent, or Firm* — Eddie E. Scott

(57) ABSTRACT

Application of axial seed magnetic fields in the range 20-100 T that compress to greater than 10,000 T (100 MG) under typical NIF implosion conditions may significantly relax the conditions required for ignition and propagating burn in NIF ignition targets that are degraded by hydrodynamic instabilities. Such magnetic fields can: (a) permit the recovery of ignition, or at least significant alpha particle heating, in submarginal NIF targets that would otherwise fail because of adverse hydrodynamic instability growth, (b) permit the attainment of ignition in conventional cryogenic layered solid-DT targets redesigned to operate under reduced drive conditions, (c) permit the attainment of volumetric ignition in simpler, room-temperature single-shell DT gas capsules, and (d) ameliorate adverse hohlraum plasma conditions during laser drive and capsule compression. In general, an (Continued)

applied magnetic field should always improve the ignition condition for any NIF ignition target design.

13 Claims, 3 Drawing Sheets

(51) Int. Cl.
    *G21B 1/05* (2006.01)
    *G21B 1/03* (2006.01)
(58) Field of Classification Search
    CPC .......... G21B 1/05; G21B 1/052; G21B 1/055; G21B 1/057; G21B 1/21
    See application file for complete search history.

(56) References Cited

OTHER PUBLICATIONS

Lawson, J D., "Some Criteria for a Power Producing Thermodynamic Reactor;", received Nov. 1956, Prot. Phys. Soc. (UK) B70;, 1957, 6-10.*
Ch. Seife "Sun in a Bottle", Chapter 5, published by Viking Penguin, member of the Penguin Group, ISBN 978-0-670-02033-1; USA (2008).*
Ch. Seife. "Sun in a Bottle", Chapter 6, published by Viking Penguin, member of the Penguin Group, ISBN 978-0-670-02033-1; USA (2008).*
Ch. Seife. "Sun in a Bottle", Chapter 8, published by Viking Penguin, member of the Penguin Group, ISBN 978-0-670-02033-1; USA (2008).*
Rider, T H., "Fundamental limitations on plasma fusion systems not in thermodynamic equilibrium", Phys. Plasmas 4(4), Apr. 1997, 1039-1046.*
L.A. Artsimovich, "Controlled Thermonuclear Reactions", Gordon and Breach (first English edition) 1964, pp. 1-9.*
Betti et al., "Deceleration Phase of Inertial Confincement Fusion Implosions," Phys. Plasmas, vol. 9, No. 5, 2002, pp. 2277-2286.
Braginskii, "Transport Processes in Plasmas", Reviews of Plasma Physics, vol. I, 1965, pp. 205-311.
Chang et al., "Fusion Yield Enhancement in Magnetized Laser-Driven Implosions," PRL, vol. 107, 2011, pp. 035006-1 to 035006-4.
Edwards et al., "Progress Towards Ignition on the National Ignition Facilicy," Phys. Plasmas, vol. 20, 2013, pp. 070501-1 to 070501-10.
Glenzer et al., "Cryogenic Thermonuclear Fuel Implosions on the National Ignition Facility," Phys. Plasmas, vol. 19, 2012, pp. 056318-1 to 056318-15.
Gotchev et al., "Laser-Driven Magnetic-Flux Compression in High-Energy-Density Plasmas," PRL, vol. 103, 2009, pp. 215004-1 to 215004-4.
Haan et al., "Point Design Targets, Specifications, and Requirements for the 2010 Ignition Campaign on the National Ignition Facility," Phys. Plasmas, vol. 18, 2011, pp. 0510001-1 to 051001-47.
Hohenberger et al., "Inertial Confinement Fusion Implosions with Imposed Magnetic Field Compression Using the OMEGA Laser," Phys. Plasmas, vol. 19, 2012, pp. 056306-1 to 056306-10.
Jones et al., "The Physics of Burn in Magnetized Deuterium-Tritium Plasmas," Nuclear Fusion, vol. 26, No. 2, 1986, pp. 127-137.
Kirkpatrick et al., "Magnetized Target Fusion:An Overview," Fusion Technology, vol. 27, 1995, pp. 201-214.
Knauer et al., "Compressing Magnetic Fields with High-Energy Lasers," Phys. Plasmas, vol. 17, 2010, pp. 056318-1 to 056318-8.
Landen et al., "Progress in the Indirect-Drive National Ignition Campaign," Plasma Phys. Control Fusion, vol. 54, 2012, pp. 1-9.
Lindl et al., "The Physics Basis for Ignition Using Indirect-Drive Targets on the National Ignition Facility," Phys. Plasmas, vol. 11, No. 2, 2004, pp. 339-491.
Lindemuth et al., "Magnetohydrodynamic Behavior of Theremonuclear Fuel in a Preconditioned Electron Beam Imploded Target," Phys. Fluids, vol. 24(4), 1981, pp. 746-753.
Lindemuth et al., "Parameter Space for Magnetized Fuel Targets in Intertial Confinement Fusion," Nuclear Fusion, vol. 23, No. 3, 1983, pp. 263-284.
National Nuclear Security Administration's, Path Forward to Achieving Ignition in the Inertial Confinement Fusion Program, (U.S. Department of Energy), 2012, 37 pp.
Olsen et al., "Fuel Preconditioning Studies for e-Beam Fusion Targets," J. Appl. Phys., vol. 50(5), 1979, pp. 3224-3230.
Perkins et al., The Application of Compressed Magnetic Fields to the Ignition and Thermonuclear Burn of Inertial Confinement Fusion Targets, LLNL-JRNL-628792, 2013, 14 pp.
Sweeney et al., "High-Gain, Low-Intensity ICF Targets for a Charged-Particle Beam Fusion Driver," Nuclear Fusion, vol. 21, No. 1, 1981, pp. 41-54.

* cited by examiner

APPLICATION OF COMPRESSED MAGNETIC FIELDS TO THE IGNITION AND THERMONUCLEAR BURN OF INERTIAL CONFINEMENT FUSION TARGETS

CROSS-REFERENCE TO RELATED APPLICATIONS

This application claims benefit under 35 U.S.C. § 119(e) of U.S. Provisional Patent Application No. 61/826,598 filed May 23, 2013 entitled "Application of Compressed Magnetic Fields to the Ignition and Thermonuclear Burn of Inertial Confinement Fusion Targets," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to energy research, and more particularly to indirect-drive for laser-driven energy research utilizing laser beams.

State of Technology

In inertial confinement fusion (ICF), a driver—i.e., a laser, heavy-ion beam or a pulse power system—delivers an intense energy pulse to a target containing around a milligram of deuterium-tritium (DT) fusion fuel in the form of a hollow shell. The fuel shell is rapidly compressed to high densities and temperatures sufficient for thermonuclear fusion to commence. The goal of present ICF research is to obtain ignition and fusion energy gain from a DT target. The gain of an ICF target is defined as the ratio of the fusion energy produced to the driver energy incident on the target and is a key parameter in determining economic viability of future inertial fusion energy power plants. The article, Laser lab shifts focus to warheads, in *Nature*, Vol. 491, Nov. 8, 2012 includes the statement: "The NNSA is planning to emphasize experiments that mimic conditions inside nuclear weapons, generating data to validate the computer codes used to check that the nation's war heads remain viable essential work, given the voluntary moratorium on underground testing that began in 1992."

The National Ignition Facility (NIF) is presently seeking to demonstrate energy research in the laboratory for the first time by means of indirect-drive. The laser energy is first converted to x-rays in a hohlraum surrounding the fuel capsule and the x-rays then perform the ablatively-driven compression of the capsule. Direct-drive is an alternative method of imploding ICF targets where the laser beams impinge directly on the capsule surface and directly cause ablation compression. In both cases, ignition is initiated by the PdV work of the high-velocity converging shell stagnating on a central hotspot. The article, The National Ignition Facility: Transition to a User Facility, by E. I. Moses, J. Atherton, L. Lagin, D. Larson, C. Keane, B. MacGowan, R. Patterson, M. Spaeth, B. Van Wonterghem, P. Wegner and R. Kauffman, in Journal of Physics: Conference Series, Volume 688, conference 1, in the abstract includes the statement: "The National Ignition Facility (NIF) at Lawrence Livermore National Laboratory (LLNL) has been operational since Mar. 2009 and has been transitioning to a user facility supporting ignition science, high energy density science (HEDS), national security applications, and fundamental science."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an indirect-drive method for inertial confinement fusion utilizing laser beams. The method includes the steps of providing a unit of fusion fuel, assembling a hohlraum containing the unit of fusion fuel in a position to the receive the laser beams, employing the hohlraum as a soleniodal coil to produce a magnetic field directed to the unit of fusion fuel.

The present invention also provides an indirect-drive apparatus for inertial confinement fusion utilizing laser beams including a unit of fusion fuel; a hohlraum, wherein the unit of fusion fuel is located within the hohlraum and wherein the hohlraum is located in a position to the receive the laser beams; and a power supply operably connected to the hohlraum producing a single turn solenoid using the hohlraum providing a magnetic field directed to the unit of fusion fuel.

In one embodiment, the present invention provides the application of axial seed magnetic fields in the range 20-100 T that compress to greater than 10,000 T (100 MG) under typical NIF implosion conditions and may significantly relax the conditions required for ignition and propagating burn in NIF ignition targets that are degraded by hydrodynamic instabilities. Such magnetic fields can: (a) permit the recovery of ignition, or at least significant alpha particle heating, in submarginal NIF targets that would otherwise fail because of adverse hydrodynamic instability growth, (b) permit the attainment of ignition in conventional cryogenic layered solid-DT targets redesigned to operate under reduced drive conditions, (c) permit the attainment of volumetric ignition in simpler, room-temperature single-shell DT gas capsules, and (d) ameliorate adverse hohlraum plasma conditions during laser drive and capsule compression. In general, an applied magnetic field should always improve the ignition condition for any NIF ignition target design.

In one embodiment, Applicant proposes that the NIF hohlraum itself can be employed as a single turn solenoid to generate the in-situ field, driven by either a co-located pulsed power supply and transmission line or by laser drive via 1-quad of NIF beams for ~100 T or greater.

The present invention has, among other uses, the following uses: To apply high initial seed magnetic fields directly to indirect-drive ICF ignition capsules by employing the surrounding hohlraum as a soleniodal coil. To increase the probability of achieving ignition and fusion energy gain in the present NIF cryogenic, layered solid-DT NIF ignition capsule To permit the achievement of ignition and propagating thermonuclear burn in cryogenic, layered solid-DT NIF ignition capsules redesigned to operate under relaxed implosion conditions. To permit the achievement of volumetric thermonuclear burn in simple, room-temperature single-shell DT gas capsules with low density pusher/ablator shells. To permit the achievement of volumetric thermonuclear burn in simple room-temperature DT gas capsules with single-shell high density metal-oxide-beryllium pusher/ablator shells. To ameliorate adverse hohlraum plasma condition during laser illumination and capsule compression The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1A:
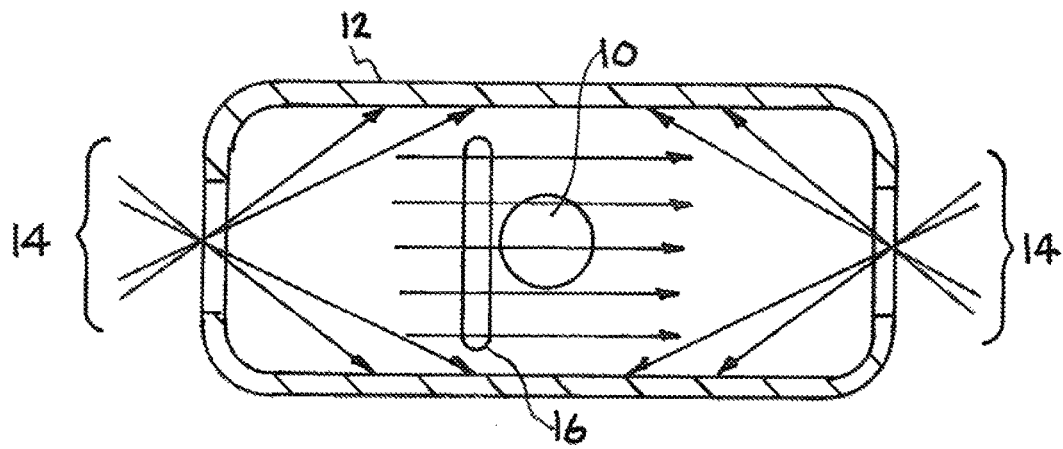
FIG. 1A illustrates the NIF ignition target comprising cylindrical gold hohlraum and cryogenic DT fuel capsule.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

In inertial confinement fusion (ICF), around a milligram of deuterium-tritium (DT) fusion fuel is rapidly compressed to high densities and temperatures sufficient for thermonuclear fusion to commence. Complete burning of a 50:50 mix of DT through the fusion reaction $2H+3H \rightarrow n+4He+17.6$ MeV, would release a specific energy of $3.38 \times 10^{11}$ J/g.

The National Ignition Facility (NIF) is presently seeking to demonstrate laser-driven ICF ignition and fusion energy gain in the laboratory for the first time by means of indirect-drive. Here, laser energy is first converted to x-rays in a hohlraum surrounding the fuel capsule comprising a spherical shell of cryogenic solid DT fuel and an outer CH plastic ablator. Radiation is rapidly coupled to the ablator and, as the heated plasma expands outwards, momentum conservation causes the remaining target to be imploded inward. The capsule approaches uniform acceleration until spherical convergence effects and gas backpressure decelerates the shell, compressing its solid fuel, and converting its kinetic energy into PdV work on a central gas "hotspot".

Under appropriate conditions, this can initiate fusion ignition, i.e., a thermonuclear deflagration burn wave propagating out from the hotspot into the compressed fuel via deposition of the 3.5 MeV alpha particles from the DT reaction.

The ignition campaign on NIF to date has made significant progress with around thirty cryogenic-DT target implosions returning experimental data of unprecedented value. The quality of implosions have progressed substantially but, at present, the fusion yield remains a factor of around ten lower than required to initiate bootstrap alpha heating, and the fuel is compressing to around one-half that required for ignition. The criterion for ignition and propagating burn is determined by the time-dependent balance between hotspot energy gains (shell Pd V work and fusion alpha deposition) and losses (hydrodynamic expansion, electron heat conduction and radiation). Achievement of ignition in the conventional situation of no applied magnetic field requires the attainment of a well formed hotspot with central ion temperature of ~12 keV, an areal density of ~0.5 g/cm2 and pressure of around $10^{17}$ Pa (1000 GBar).

In this invention, the application of external magnetic seed fields within in the hohlraum that will compress to high values under typical NIF implosion conditions can relax the hotspot conditions required for ignition and thermonuclear burn. In particular, such applied fields can recover ignition in submarginal NIF capsules that would otherwise fail because of deleterious hydrodynamic instabilities. More generally, they can also permit the attainment of hotspot ignition in targets redesigned to operate under relaxed drive conditions or volumetric ignition in simple single-shell room-temperature DT gas capsules. Ignition for the latter gas capsules would not be possible on NIF in indirect-drive without such a field. This approach is intended to enhance the ignition probability of the standard ignition target and extensions thereof. In general, Applicants' analyses indicate that an applied magnetic field(s) should always improve the ignition condition for any NIF ignition capsule.

The potential advantages of strong magnetic fields in ICF were recognized four decades ago, followed by a number of numerical studies. There it was recognized that magnetizing a plasma with compressed field reduces electron heat conduction perpendicular to the field. Electron confinement and suppression of perpendicular electron heat conduction requires compressed fields in the vicinity of ~1000 T (10 MG). In addition, stronger compressed fields of the order of ~10,000 'T' (100 MG) were predicted to localize the deposition range of charged fusion burn products within the hotspot to around that of their gyro orbits which, for the 3.5 MeV DT alpha particle, is ~54/B(T) cm. Below, Applicants identify three further mechanisms that compressed magnetic fields offer to improve the probability of achieving ignition in ICF Laser-driven magnetic flux compression within a cylindrical direct-drive ICF target has been performed on the OMEGA laser facility, where a pair of small co-located Helmholtz coils generated an initial seed field of ~16 T at the coils, ~9 T at the target and achieved a field compression factor within the target of ~1000. In recent laser-driven, direct-drive magnetized implosions in spherical geometry on OMEGA, a magnetic seed field of ~8 T was generated in a spherical CH target containing 10 atm of deuterium gas by a single coil with diameter around twice that of the target. The compressed field attained a maximum central value of 8000 T (80 MG). As a result of the hot-spot magnetization, electron radial heat losses were suppressed and observed ion temperatures and neutron yields were enhanced by 15% and 30%, respectively, relative to non-magnetized controls.

Application of seed magnetic fields in the axial direction that compress to greater than 10,000 T (100 MG) under typical NIF implosion conditions can significantly relax the conditions required for ignition and propagating burn in NIF ignition targets that are degraded by hydrodynamic instabilities. Such magnetic fields can permit the recovery of ignition, or at least significant alpha particle heating, in submarginal NIF capsules that would otherwise fail because of adverse hydrodynamic instability growth or, more generally, permit the attainment of ignition in cryogenic targets redesigned to operate under reduced drive conditions and in simpler, room-temperature single-shell DT gas capsules.

Figure 1B:
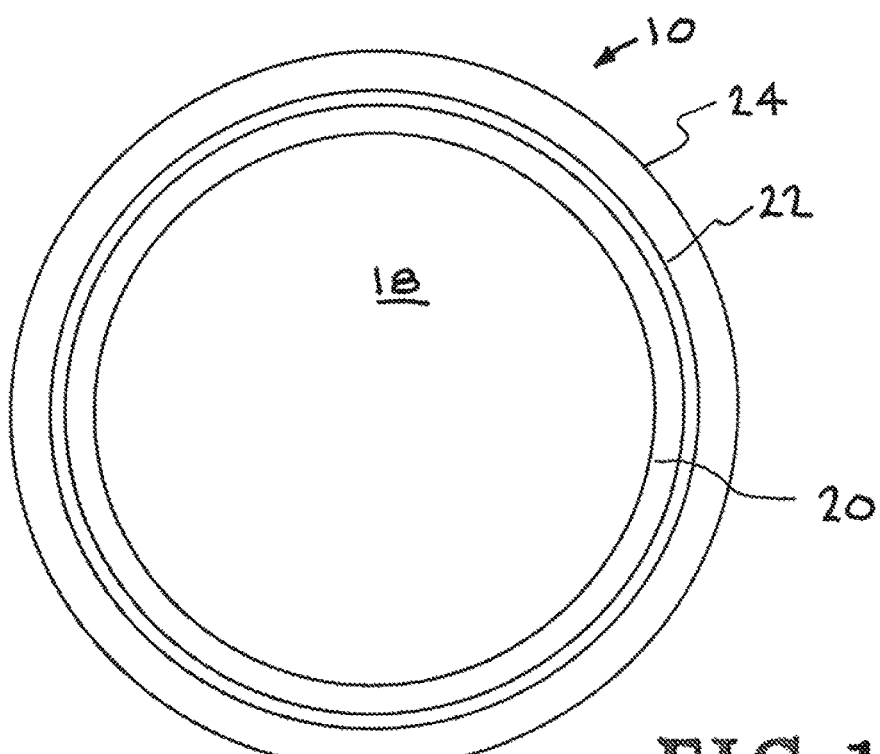
FIG. 1B illustrates the fuel capsule radial build and composition used in this application.

Referring now to the drawings and in particular to FIGS. 1A and 1B, the NIF ignition target comprising cylindrical gold hohlraum and cryogenic DT fuel capsule is illustrated in FIG. 1A and the fuel capsule radial build and composition used in this application is illustrated in FIG. 1B.

FIG. 1A shows the conventional NIF indirect drive ignition platform employed in Applicants' radiation-hydrodynamic simulations to demonstrate the beneficial effect of the compressed magnetic field on ignitability. The DT fuel capsule 10 is fielded as a cryogenic layer on the inside a spherical plastic ablator and mounted in the center of a cylindrical gold hohlraum 12. The hohlraum is illuminated with 192 laser beams 14 with a total laser energy typically in the range 1.5-1.7 MJ to produce a soft x-ray flux with ~300 eV temperature. Applicants' applied axial seed magnetic field 16 is directed as shown along the cylindrical axis of the hohlraum as shown in FIG. 1A.

FIG. 1B is an enlarged cross section of the DT fuel capsule 10 of FIG. 1A. The capsule 10 includes an inner volume of DT gas (0.3 μg/cm$^2$), a layer 20 of solid DT fuel (68 μm), an ablator layer 22 (1%, 2% Si dopants, 195 μm) and an outer plastic shell 24 (1108 μm).

Figure 2:
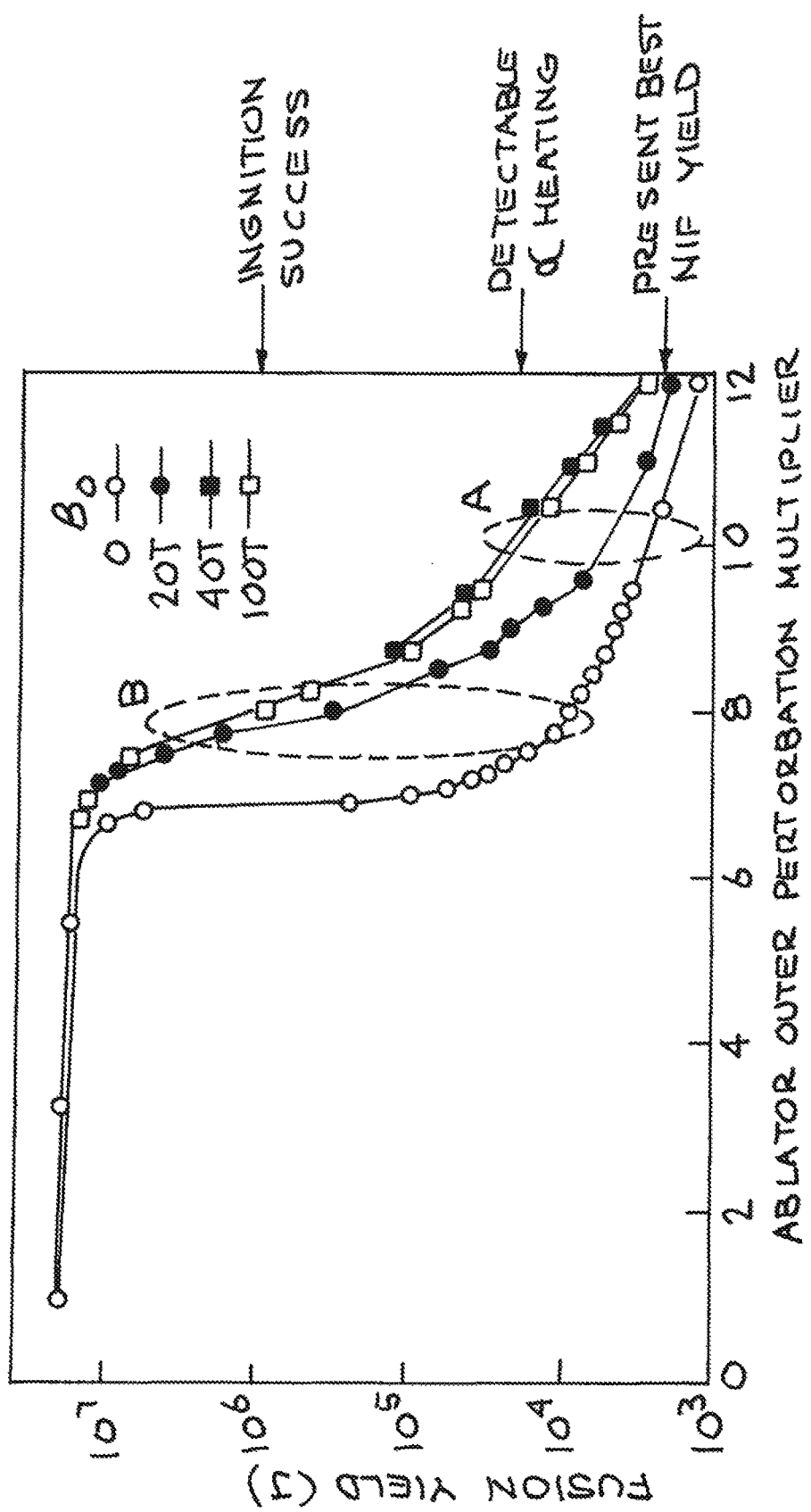
FIG. 2 shows results of applying an external axial magnetic field.

In the solid black line of FIG. 2 with open circles, Applicants show the fusion yield performance from Applicants' LASNEX radiation-hydrodynamic simulations of this capsule with no applied magnetic field as a function of the multiplier f_pert on the amplitude of the outer ablator surface perturbation with all other perturbations maintained at their nominal X1 values. Such increasing outer surface perturbations can be taken to represent either greater than nominal surface roughness or approximate surrogates for, e.g., low mode perturbations in the radiation drive resulting from line-of-sight M-band ($â^3$1.8 keV) and N-band (~1 keV) emissions from the gold hohlraum, isolated modes such as the Mylar capsule support tent in the hohlraum (equivalent mode number of ~15), or other such asymmetric disturbances. In this way Applicants are able to impose an increasing lower mode perturbation until the capsule fails to ignite due to the growth of deleterious hydrodynamic instabilities and then assess potentially ameliorating effects due to applied magnetic fields. The solid black ignition curve with open circles in FIG. 2 is characterized by ignition and essentially full 19 MJ yield from f_pert=1 to ~6.5, an ignition "cliff" from f_pert=~6.5 to 7.5 where fusion yield falls by three orders of magnitude, and a slowly decreasing, low yield region for f_pert $â^3$7.5. In the first of these, the capsule ignites at a central temperature of ~12 keV and peak values of the ion temperature during burn exceed 100 keV. In the latter low fusion yield region of the curve, the hotspot hydrodynamic parameters are determined only by the energy imparted by the perturbed stagnating shell and energy deposition from fusion alpha particles plays a negligible role.

Results of applying an external axial magnetic field is shown in FIG. 2 where the curves with solid black circles, solid black squares and open squares show the fusion yield curves versus outer surface perturbation f_pert for initial seed fields of 20, 40 and 100T, respectively. The major effect is seen to be a shift of the ignition cliff to the right in that the capsule can now attain ignition and appreciable yields at perturbation parameters that would otherwise result in only low yield, non-igniting capsules. Further, even at very high shell perturbations of f_pert≥9, fusion yields with the field are around an order of magnitude higher, with hotspot conditions enhanced over those resulting from shell PdV heating alone and indicating detectable alpha heating. In particular, conventional, zero-field capsules that today give best available fusion yields around 2.5 kJ may then attain the regime of detectable alpha particle heating with compressed field (dashed circle A in FIG. 2), while improved future zero-field capsules that exhibit detectable alpha healing may attain the ignition regime with compressed field (dashed circle B in FIG. 2).

Another advantage of axial fields that Applicants identify is that they can ameliorate detrimental hohlraum plasma conditions. Benefits include suppression of hohlraum wall blow-off motion, higher hohlraum plasma temperature that causes increased Landau damping of stimulated Raman scattering, range suppression of preheat electrons, etc., and might permit the use of vacuum hohlraums. The latter would have no windows or fill gas and would thus would reduce laser-plasma instabilities such as two-plasmon decay from the window and Raman and Brillouin backscatter.

Figure 3A:
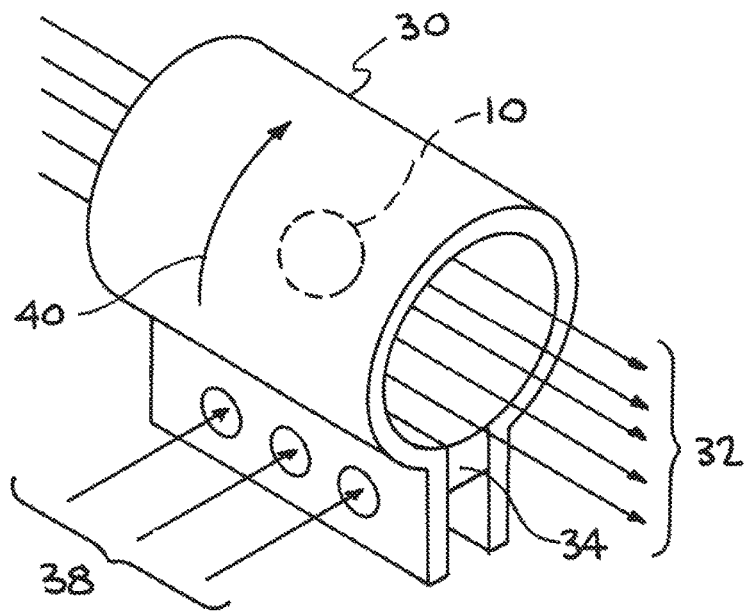
FIGS. 3A and 3B show schematics of employing the NIF hohlraum as a single turn solenoid to generate the seed magnetic field.
Figure 3B:
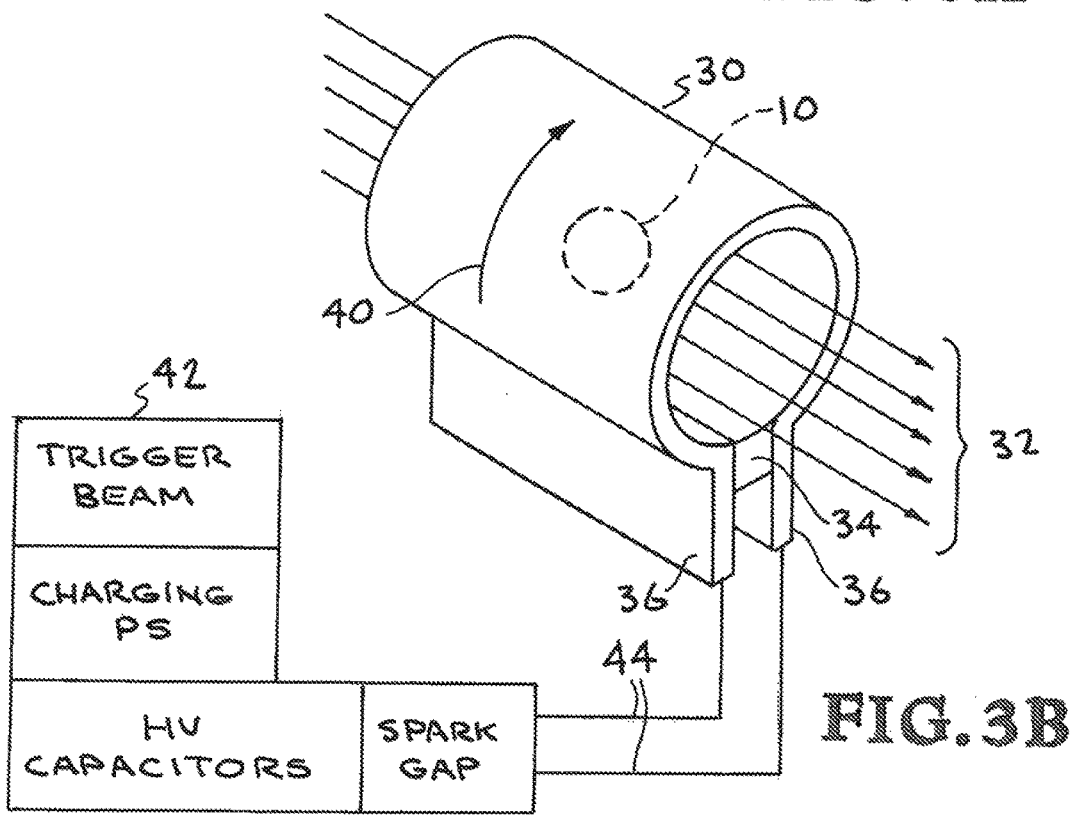

FIGS. 3A and 3B illustrate two methods for creating the initial axial seed magnetic field 32. In FIG. 3A a laser-initiation system is used to create a current flow 40 in the hohlraum 30. The hohlraum shown in FIGS. 3A and 3B is a single-turn solenoid 30. In FIG. 3B the method used to create the initial axial seed magnetic field will be a co-located pulsed power supply 42 and transmission line 44.

Applicants believe that the NIF hohlraum itself can be employed as a single turn solenoid containing a narrow insulating slot parallel to the hohlraum axis filled with a metal-oxide (See FIGS. 3A and 3B). In one embodiment it would be driven by a co-located pulsed power supply and transmission line for initial seed fields of ~20-40 T (See FIG. 3B). In another embodiment it would be driven by laser drive via 1-quad of NIF beams for ~100 T or greater (See FIG. 3A). Maximum fields attainable by such a power supply will be constrained by power supply location, switching, and inductance of the supply-transmission line-coil system and may be limited to around ~40 T. Applicants identify that very high seed fields could be attainable with laser-initiation of the field as shown in FIG. 3A due to the very low inductance and high current rise. Here Applicants propose that one quad of NIF beams (~35 kJ energy) could produce an initial seed field of ~100 T or greater.

Summary Features of the Present Invention

1. The concept of employing an initial seed magnetic field within an indirect-drive hohlraum and that compress to high values under implosion in NIF ignition capsules to:
   (1.1) increase the probability of achieving ignition and propagating thermonuclear burn in the present cryogenic, layered solid-DT NIF ignition capsule;
   (1.2) achieve ignition and propagating thermonuclear burn in cryogenic, layered solid-DT NIF ignition capsules redesigned to operate under relaxed implosion conditions including, but not limited to, thicker inflight shells and/or lower convergence ratio and/or lower velocities;

(1.3) achieve volumetric thermonuclear burn in simple, medium-pressure (tens of atmospheres) room-temperature single-shell DT gas capsules with various pusher/ablator shells including, but not limited to, plastic high-density-carbon (diamond), beryllium or boron-carbide;

(1.4) achieve volumetric thermonuclear burn in medium-pressure (tens of atmospheres) room-temperature single-shell DT gas capsules with metal-oxide-beryllium pusher/ablator shells; the use here of high-radiation-opacity high density metal-oxides additionally enables volumetric ignition to be initiated at ignition temperatures reduced from ~12 keV to ~4 keV due to the trapping of Bremsstrahlung radiation energy loss; (Ignition for the target concepts in (1.3) and (1.4) above would not be possible on NIF in indirect-drive without such and applied field)

(1.5) ameliorate adverse hohlraum plasma condition during laser illumination and capsule compression including, but not limited to, suppression of wall blow-off motion, higher hohlraum plasma temperature that benefits increased. Landau damping of stimulated Raman scattering, range suppression of preheat electrons, etc; application of strong initial seed magnetic fields may also allow the use of vacuum hohlraums; unlike the present NIF hohlraum design, the latter have no windows or fill gas and thus would reduce laser-plasma instabilities such as two-plasmon decay from the window and stimulated Raman and Brillouin backscatter.

These enhanced ignition conditions accrue from the following physical processes in the capsule due to the compressed magnetic field: (a) suppression of electron heat conduction energy across the field thus reducing hotspot energy losses (b) shortening the deposition range of fusion alpha particles within the ignition hotspot due to their Lamor cyclotron radius in the field (c) reduction of hydrodynamic instabilities that would otherwise cause deleterious perturbations to the integrity of the boundary between the hotspot and the tamping shell (d) magnetic-mirror trapping of fusion alpha particles in the compressed mirror field (see also 5. below) thus localizing their deposition range within the hotspot (e) reduction of the flux tube area for electron heat conduction due to the compressed mirror field (see 5. below) thus reducing hotspot energy loss parallel to the field (Processes (a) and (b) above were recognized in previous work. Processes (c) through (d) are new findings from Applicants' present work).

2. The concept of employing the hohlraum 30 itself as a single-turn solenoid to create the initial seed magnetic field 32, and containing a narrow axial slot filled with a metal-oxide 34 to insulate the current supply terminals 36 (See FIG. 3A). Maximum seed fields of around ~40 T will be obtained using a co-located pulsed power supply and transmission line—see FIG. 3B.

3. The concept of laser-initiation of the hohlraum solenoid current supply terminals to achieve initial seed magnetic fields of around 100T or greater —see FIG. 3A.

4. The concept of employing a rugby-shaped hohlraum to (a) enhance the mirror nature of the initial magnetic field and (b) to deflect detrimental hot electrons, generated by laser plasma instabilities near the hohlraum laser-entrance-holes, away from the capsule 5. The concept of employing an initial shimmed, non-spherical capsule to enhance the magnetic mirror nature of the final magnetic field at full compression.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An indirect-drive method for laser driven energy research utilizing laser beams, comprising the steps of:

providing a spherical outer plastic shell, providing an ablator layer inside said spherical outer plastic shell, providing a unit of deuterium-tritium fuel a layer inside said ablator layer, providing an inner volume of deuterium-tritium gas inside said layer of deuterium-tritium fuel, assembling a hohlraum around said spherical outer plastic shell containing said unit of deuterium-tritium fuel wherein said hohlram is in a position to the receive the laser beams and wherein said hohlram has an axis, shaping said hohlraum as single-turn solenoid, providing a narrow insulating slot in said single turn) solenoid hohlraum wherein said narrow insulating slot is parallel to said hohlraum axis, directing the laser beams onto said hohlraum, and employing said hohlraum as a soleniodal coil to produce a magnetic field directed to said unit of deuterium-tritium fuel.

2. The indirect-drive method for laser-driven energy research utilizing laser beams of claim 1 wherein said step of employing said hohlraum as soleniodal coil to produce a magnetic field directed to said unit of deuterium-tritium fuel comprises employing said hohlraum as a soleniodal coil to produce a magnetic field directed to said unit of deuterium-tritium fuel to compress said unit of deuterium-tritium fuel to greater than 10,000 T (100MG).

3. The indirect-drive method for laser-driven energy research utilizing laser beams of claim 1 wherein said step of employing said hohlraum as a soleniodal coil to produce a magnetic field directed to said unit of deuterium-tritium fuel comprises employing said hohlraum as a soleniodal coil as a single-turn solenoid to produce a magnetic field directed to said unit of deuterium-tritium fuel.

4. The indirect-drive method for laser-driven energy research utilizing laser beams of claim 1 wherein said step of assembling a hohlraum containing said unit of deuterium-tritium fuel in a position to the receive the laser beams comprises assembling a cylindrical gold hohlraum containing said unit of deuterium-tritium fuel in a position to the receive the laser beams.

5. The indirect-drive method for laser-driven energy research utilizing laser beams of claim 1 wherein said step of providing a unit of deuterium-tritium fuel comprises providing a DT fuel capsule.

6. The indirect-drive method for laser-driven energy research utilizing laser beams of claim 1 wherein said step of providing a unit of deuterium-tritium fuel comprises providing a DT fuel capsule and wherein said step of assembling a hohlraum containing said unit of deuterium-tritium fuel in a position to the receive the laser beams comprises assembling a cylindrical gold hohlraum containing said DT fuel capsule in a position to the receive the laser beams.

7. An indirect-drive method fur laser-driven energy research utilizing laser beams from a first direction and laser beams from a second direction to increase the probability of achieving ignition, comprising the steps of:

providing a spherical outer plastic shell, providing an ablator layer inside said spherical outer plastic shell, providing a unit of deuterium-tritium fuel as a layer inside said ablator layer, providing an inner volume of deuterium-tritium gas inside said layer of deuterium-tritium fuel, assembling a hohlraum around said spherical outer plastic shell containing said unit of deuterium-tritium fuel in a position to the receive beams from a first direction and the laser beams from a second direction wherein said hohlram has an axis, shaping said hohlraum as single-turn solenoid, providing a narrow insulating slot in said single-turn solenoid hohlraum wherein said narrow insulating slot is parallel to said hohlraum axis, filling said narrow insulating slot with a metal-oxide, directing the laser beams onto said hohlraum, and employing said hohlraum as a soleniodal coil to axial seed a magnetic field on said unit of deuterium tritium fuel.

8. The indirect-drive method for laser-driven energy research utilizing laser beams from a first direction and laser beams from a second direction to increase the probability of achieving ignition of claim 7 wherein said step of employing said hohlraum as a soleniodal coil to produce a magnetic field directed to said unit of deuterium-tritium fuel comprises employing said hohlraum as a soleniodal coil to produce a magnetic field directed to said unit of deuterium-tritium fuel to compress said unit of deuterium-tritium fuel to greater than 10,000 T (100MG).

9. The indirect -drive method for laser-driven energy research utilizing laser beams from a first direction and laser beams from a second direction to increase the probability of achieving ignition of claim 7 wherein said step of employing said hohlraum as a soleniodal coil to produce a magnetic field directed to said unit of deuterium-tritium fuel comprises employing said hohlraum as a soleniodal coil as a single-turn solenoid to produce a magnetic field directed to said unit of deuterium-tritium fuel.

10. The indirect-drive method for laser-driven energy research utilizing laser beams from a first direction and laser beams from a second direction to increase the probability of achieving ignition of claim 7 wherein said step of assembling hohlraum containing said unit of deuterium-tritium fuel in a position to the receive the laser beams from a first direction and the laser beams from a second direction comprises assembling a cylindrical gold hohlraum containing said unit of deuterium-tritium fuel in a position to the receive the laser beams from a first direction and the laser beams from a second direction.

11. The indirect-drive method for laser-driven energy research utilizing laser beams from a first direction and laser beams from a second direction to increase the probability of achieving ignition of claim 7 wherein said step of providing a unit of deuterium-tritium fuel comprises providing a DT fuel capsule.

12. The indirect-drive method for laser-driven energy research utilizing laser beams from a first direction and laser beams from a second direction to increase the probability of achieving ignition of claim 7 wherein said step of providing a unit of deuterium-tritium fuel comprises providing a DT fuel capsule and wherein said step of assembling a hohlraum containing said unit of deuterium-tritium fuel in a position to the receive the laser beams from a first direction and the laser beams from a second direction comprises assembling a cylindrical gold hohlraum containing said DT fuel capsule in a position to the receive the laser beams from a first direction and the laser beams from a second direction.

13. An indirect-drive method for laser-driven inertial confinement fusion research utilizing laser beams, comprising the steps of:

providing a spherical outer plastic shell, providing an ablator layer inside said spherical outer plastic shell, providing a unit of deuterium-tritium fuel as a layer inside said ablator layer, providing an inner volume of deuterium-tritium gas inside said layer of deuterium-tritium fuel, assembling a hohlraum around said spherical outer plastic shell containing said unit of deuterium-tritium fuel wherein said hohlram is in a position to the receive the laser beams and wherein said hohlram has an axis, shaping said hohlraum as single-turn solenoid, providing a narrow insulating slot in said single-turn solenoid hohlraum wherein said narrow insulating slot is parallel to said hohlraum axis, directing the laser beams onto said hohlraum, and employing said hohlraum as a soleniodal coil to produce a magnetic field directed to said unit of deuterium-tritium fuel.

\* \* \* \* \*